United States Patent [19]

Muth

[11] Patent Number: 5,409,626
[45] Date of Patent: Apr. 25, 1995

[54] METHODS AND COMPOSITIONS FOR SHORT TERM RESIDUAL DUST SUPPRESSION

[75] Inventor: Steven A. Muth, Des Plaines, Ill.

[73] Assignee: Benetech Incorporated, Aurora, Ill.

[21] Appl. No.: 69,074

[22] Filed: May 28, 1993

[51] Int. Cl.⁶ ............................................. C09K 3/22
[52] U.S. Cl. ..................................... 252/88; 44/602
[58] Field of Search .......................... 252/88; 44/602

[56] References Cited

U.S. PATENT DOCUMENTS

| | | | |
|---|---|---|---|
| 4,169,170 | 9/1979 | Docksen | 427/155 |
| 4,510,081 | 4/1985 | Bronner et al. | 252/603 |
| 4,737,305 | 4/1988 | Dohner | 252/88 |
| 4,746,543 | 5/1988 | Zinkan et al. | 427/136 |
| 4,780,233 | 10/1988 | Roe | 252/88 |
| 4,801,635 | 1/1989 | Zinkan et al. | 252/88 |
| 4,836,945 | 6/1989 | Kestner | 252/88 |
| 4,897,218 | 1/1990 | Roe | 252/88 |
| 4,971,720 | 11/1990 | Roe | 252/88 |
| 5,104,711 | 4/1992 | Marsek | 428/78 |
| 5,128,178 | 7/1992 | Roe | 44/602 |
| 5,256,444 | 10/1993 | Roe | 252/88 |
| 5,271,859 | 12/1993 | Roe | 252/88 |

Primary Examiner—Stephen Kalafut
Assistant Examiner—James M. Silbermann
Attorney, Agent, or Firm—Rogers, Howell & Haferkamp

[57] ABSTRACT

An aqueous short term residual dust suppressant is disclosed. The suppressant comprises from about 50 parts by weight to about 2,000 parts by weight water per part by weight of a combination of an anionic foamer and a nonionic or anionic wetter in a foamer to wetter weight ratio of from about 1:1 to about 1:20. Pre-mix concentrates and methods for dust suppression with such suppressants are also disclosed.

8 Claims, No Drawings

METHODS AND COMPOSITIONS FOR SHORT TERM RESIDUAL DUST SUPPRESSION

BACKGROUND OF THE INVENTION

1. Field of the Invention

The present invention relates to short term residual dust suppression, and more particularly to such suppression by use of an aqueous mixture of a foaming agent and a wetting agent.

2. Description of the Prior Art

Dust formation from a variety of sources has been a continuing cause of environmental and health concerns. Particular attention has been paid to the dust developed from the handling of coal, but such sources also include, for example, petroleum coke, recycled glass dust and bauxite. Thus, while in this specification, reference is often made to coal, it should be understood that this discussion is applicable to numerous other dust sources as well.

The various industries affected by such dust formation have engaged in many efforts to avoid or to alleviate the problem of dust formation that results during handling, conveyance, transportation and even storage of coal and the other dust sources. Typically, such efforts involve the use of water incorporated into a chemical dust suppressant applied to the coal or other source. Conventionally, although the categories of dust suppressants have overlapped to some extent in that certain types of suppressants may be reformulated to be applied through a system designed for another type, a suppressant may fall into the category of a short term dust suppressant, which may be a wet suppressant or a foam suppressant, or a long term residual dust control suppressant. Short term dust suppressants function by coating the source and dust with water. Thus, such suppressants lose their effectiveness upon evaporation of the water. Moreover, their effectiveness generally does not persist beyond one to two impact points; that is, points at which dust is generated during handling or movement of the coal or other source. Examples of wet and foam suppressants are discussed in U.S. Pat. Nos. 4,737,305 to Dohner, 4,836,945 to Kestner and 4,971,720 to Roe, and in *Surfactants and Interfacial Phenomena, 2d Edition,* by Milton J. Rosen, Wiley Interscience Publications (1989), all of which are incorporated herein by reference. Long term residual dust suppressants control dust by means of the formation of a polymer or binder film over the dust source and thereby persist even after evaporation of water in the suppressant. The present invention relates to a new type of short term dust suppressants that may be applied as a wet suppressant or as a foam suppressant.

Wet suppression is based on what is called "wet technology". This suppression can be as simple as spraying large amounts of water on the coal (or other source) as it travels along a conveyor or drops to a storage pile or transfer bin. However, although water is an effective dust suppressant, its use involves a number of drawbacks, such as adding weight to the coal or other source (which can result in higher costs for transporting the source), development of substantial vapor pressure when the coal or other source is heated or burned, and the absorption and thus wasting of substantial energy as the water vaporizes when the coal or other source is heated or burned.

As a result, surfactants or "wetters" often are added to the water to reduce the amount of the water needed for dust suppression. Conventional wetters include nonionic epoxide (e.g., ethylene oxide or propylene oxide) derived block co-polymers, alcohols of from about eight to about sixteen carbons ethoxylated with from about four to about ten moles of ethylene oxide (wherein the alcohol may be an aromatic such as alkyl phenol, preferably nonylphenol, which can be ethoxylated with, for example, ten moles ethylene oxide), and branched nonionic surfactants such as branched alpha sulfo ester salts comprising an acid chain and an alcohol chain of from about six to about twelve carbons each, and highly branched alcohol sulfate and alcohol ether sulfate detergents. Generally, the wetter is added to the water in a weight proportion of from about 0.2 to about 5 parts of the wetter to about one thousand parts of water. As this concentration, the wetter acts at the interface between the coal (or other source) and the water to increase the affinity of the coal and water, thereby decreasing the amount of water needed to soak the coal as well as decreasing the time required for the water to penetrate the coal stream.

Typically, such wet technology is employed to suppress dust Generated at transfer points, areas where the coal falls freely from one point to another (free falls) such as loading points where the coal is dropped into a vessel for transportation, impact points where the coal strikes a surface, and storage areas. The water is applied at the point of dust generation and is applied to the air-borne dust as well as to the source of the dust. If the amount of water added to the coal is sufficiently great, the coal can be prevented from dusting significantly on impact. For such benefits, the water should be added in an amount sufficient to result in a proportion of one to three parts by weight water per one hundred parts by weight wetted coal. However, because the suppressant is effective only through one or two impact points where dust could be generated, repeated applications are necessary, thereby increasing the water content of the wetted coal quickly to seven or eight percent.

Foam suppressants are applied to form a blanket over the coal or other source to capture and smother dust. Bubbles in the foam suppressant catch the dust particles and so the foam suppressant is effective only until the bubbles break or the layer of foam becomes discontinuous. The foam suppressant is formed by addition of a roamer to water. Conventional foamers include alpha-olefin sulfonates, alkylphenyl sulfonates with long alkyl chains (e.g., eight to sixteen carbons) such as sodium lauryl benzene sulfonate, alcohol sulfates, alcohol ether sulfates, alpha sulfo esters and mixtures of such compounds. Under standard conditions, from about one to about twenty parts by weight foamer is added to about one thousand parts by weight water. The resulting foam has about five to ten percent of the density of the water used in wet technology and so much less water is needed for a foam to provide the same volume of applied dust suppressant as the wet suppressant. Thus, the foam suppressant can be added to the coal in a proportion such that the wetted coal contains 0.2 to 0.5 parts by weight added water per one hundred parts by weight wetted coal. However, as with the wet suppressant, the foam suppressant is effective only through one or two impact points where dust could be generated. Thus, repeated applications are necessary and the water content of the wetted coal increases quickly to several percent.

As with wet suppressants, the foam suppressants are employed to suppress dust Generated at impact or transfer points, areas where the coal falls freely from one point to another (free falls) such as loading points where the coal is dropped into a vessel for transportation, impact points where the coal strikes a surface, and storage areas. The foam is applied as a curtain or barrier to capture Generated dust. The foam applicator nozzles are located in such a way that the remaining foam and the captured dust are deposited back onto the moving coal stream. This orientation not only prevents dust from escaping into the environment, but also places at least a partial blanket of foam onto the deposited coal, which may prevent dust Generation until bubbles are broken or disrupted by another transfer point. The dust suppression effects of normal foam does not carry over from a previous application point to further impact zone.

Long term residual dust control suppressants are used to prevent Generation of dust during long term storage or during transportation. Such long term residual suppressants operate by a mechanism very different from those of short term residual suppressants to which the subject invention is directed. In short term residual (wet or foam) suppression, the water eventually evaporates, rendering the suppressant ineffective in suppressing dust over a longterm, such as during several months of outdoor storage. Thus, long term residual dust suppressants remain active long after the water evaporates. They ordinarily have some film-forming or tackifying properties. For example, U.S. Pat. No. 4,801,635 to Zinkan et al. describes a long term residual dust suppressant that includes an acrylic polymer and U.S. Pat. No. 4,169,170 to Doeken describes a long term residual dust suppressant that includes an aqueous suspension of asphalt emulsion concentrates or black liquor lignin products as a binder material. Conventionally, water is included in a long term residual suppressant typically not only to provide some dust control during handling prior to storage, but also to promote even spreading as the suppressant is applied. Long term residual dust suppressants often contain wetters or foamers as well to minimize the amount of water needed to apply the suppressant to the coal and are applied directly to the coal in what is known as a "main body treatment".

Thus, several problems are associated with conventional wet and foam dust suppression techniques to which the subject invention is directed. For example, each technique involves addition of a substantial amount of water to the coal or other dust source, especially in view of the repeated applications of water-based suppressant necessary to control dust across several impact or transfer points. The resulting high water content of the coal is particularly undesirable in that much dust suppression is performed at fossil fuel power plants. Water added to the fuel results in a portion of the heat output of the coal to be lost to vaporization of the water and so a loss of effective energy. The vaporization of water consumes substantial amounts of heat. Therefore, the addition of such significant amounts of water is particularly troublesome. In addition, the additional water increases the weight of the coal and so increases shipping costs accordingly.

Because of the substantial disadvantages associated with the addition of such significant amounts of water, the industry has attempted to minimize the amount of water employed in wet and foam suppression techniques. Such attempts typically involve the use of systems for application of the suppressant at each dust producing site instead of a single application that would be intended to last through many transfer points during transport or conveyance of the coal or other dust source. Because the suppressant in the multiple application technique remains effective for only one or two transfer points, such techniques are expensive; they require costly installation of application equipment at several transfer points, impact points and loading or "stack-out" storage sites. In addition, impact sites where dust is generated often are not accessible to the equipment employed in conventional application systems. Thus, such techniques are undesirable.

SUMMARY OF THE INVENTION

Briefly, therefore, the present invention is directed to a novel aqueous short term residual dust suppressant. The suppressant comprises from about 50 parts by weight to about 2,000 parts by weight water per part by weight of a combination of an anionic foamer and a nonionic or anionic wetter in a foamer to wetter weight ratio of from about 1:1 to about 1:20.

The present invention is also directed to a novel composition of matter useful as a premix for preparation of an aqueous short term residual dust suppressant. The composition comprises an anionic foamer and a nonionic or anionic wetter in a foamer to wetter weight ratio of from about 1:1 to about 1:20.

The present invention is further directed to a novel method for short term residual suppression of dust. The method comprises application of an aqueous short term residual dust suppressant to a medium prone to liberation of dust. The dust suppressant comprises from about 50 parts by weight to about 2,000 parts by weight water per part by weight of a combination of an anionic foamer and a nonionic or anionic wetter in a foamer to wetter weight ratio of from about 1:1 to about 1:20.

Among the several advantages found to be achieved by the present invention, therefore, may be noted the provision of a short term residual dust suppressant that employs less water than previous short term residual dust suppressants, yet is effective in suppressing dust generation; the provision of such suppressant that is effective over multiple transfer or impact points; the provision of a dry premix to which water may be added to form such suppressant; and the provision of a method for short term residual dust suppression that employs less water than do conventional methods.

DESCRIPTION OF THE PREFERRED EMBODIMENTS

In accordance with the present invention, it has been discovered that a short term dust suppressant that includes a combination of an anionic foamer and a nonionic or anionic wetter in a foamer to wetter weight ratio of from about 1:1 to about 1:20 in water is very effective in suppressing dust with surprisingly little water—generally less than 0.5—often less than 0.2—percent by weight of the wetted dust source such as coal, and remains effective over several impact points. This novel aqueous short term dust suppressant, therefore, has a residual effect that reduces the number of reapplications necessary for conventional short term dust suppressants as the dust source crosses numerous impact points. This residual effect has been found even though the suppressant may be free of acrylic polymers or binders employed in long term residual dust suppressants.

Thus, a short term residual dust suppressant has been discovered, which enables the suppression of dust with less water than is employed in conventional processes, with fewer applications than required by conventional processes as the dust source passes across several impact points, and without the need for acrylic polymers or binders employed in long term residual dust suppressants. Surprisingly, therefore, the suppressant utilizes less water and shows far greater persistence of effectiveness across impact points than achieved by using either a wetter or a foamer without the other. For inexpensive shipping, the roamer and wetter combination may be prepared as a dry or low water pre-mix to which water can be added at a later time.

The mechanism involved in achieving such superior dust suppression with small amounts of water is not known with certainty. Thus, the present inventor does not wish to be bound to any particular theory of operation. However, it is believed that the dust suppressant forms a double micelle layer around individual dust particles, the inner layer being the wetter (which has a high affinity for solid/liquid interfaces) and the outer layer being the foamer (which has a high affinity for water/air interfaces), with a small amount of water trapped between the layers. A film, therefore, is formed around the particle facilitating agglomeration of such coated particles.

As used herein, the term "foamer" refers to those surfactants employed in foam dust suppressants. Such foamers are generally linear and have a high affinity for water/air interfaces. Examples of foamers are salts of alpha-olefin sulfonates, generally linear long chain (i.e., eight to sixteen carbons) alkylphenyl sulfonates, generally linear alcohol sulfates, generally linear alcohol ether sulfates and generally linear alpha sulfo esters and mixtures of such salts. The generally linear configuration (i.e., linear with some minor branching such as a methyl or ethyl group possible, but less desirable) permits tight packing of the molecules at the air/water interface. Foamers useful in the present invention are anionic and water-soluble.

Preferred alpha-olefin sulfonate salts are sodium, potassium, magnesium or ammonium alpha-olefin sulfonates having from about ten to about fourteen carbons, such as a product available from Stepan Chemical Company under the trade designation AS-40, which is in the form of a 40% by weight aqueous solution of a twelve carbon sodium alpha-olefin sulfonate.

Preferred long chain alkylphenyl sulfonate salts have an alkyl chain of about eight to about sixteen carbons, such as sodium lauryl benzene sulfonate.

Preferred alcohol sulfate salts are sodium, potassium, magnesium or ammonium alcohol sulfates having from about ten to about sixteen carbons formed by sulfating an alkyl alcohol of from about ten to about sixteen carbons.

Preferred alcohol ether sulfate salts may also be described as salts of alkyl polyalkoxy alcohol sulfates, and are sodium, potassium, magnesium or ammonium alcohol ether sulfates having from about ten to about sixteen carbons, including from one to about six alkoxy—preferably ethoxy—units. The alcohol ether sulfate salts may be prepared by ethoxylating an alcohol of from about four to about eight carbons with one to about six moles of ethylene oxide per mole alcohol to produce an ethoxylated product of the formula $RO(CH_2CH_2)_nH$, wherein R represents an alkyl group of from about four to about eight carbons, and then sulfating the ethoxylated product, followed by salt formation.

Preferred alpha sulfo ester salts are sodium, potassium, magnesium or ammonium alpha sulfo esters having an acid chain of from about two to about sixteen carbons, including an alcohol chain of up to about sixteen carbons. In other words, they are the salts of the esterification product of a two to about sixteen carbon acid and an alcohol of up to about sixteen carbons. Preferably, the acid and alcohol are generally straight chain with little if any branching.

As used herein, the term "wetter" refers to those surfactants employed in wet dust suppressants. Such wetters have a high affinity for water/solid interfaces. Wetters are generally, although not necessarily, characterized by their predominantly branched carbon chains (i.e., at least half of the carbons in the carbon chain are in branches). The carbon chain branches may constitute half of the hydrophobic carbon chain of the wetter. Wetters that are not predominently branched are polyethoxylated surfactants that have a large, bulky, hydrophylic chain, which allows a relatively large molecular "footprint" at the solid liquid interface. The wetters are water-soluble and may be an anionic surfactant or a nonionic surfactant or a mixture of such surfactants. Examples of wetters that are anionic surfactants are salts of alpha sulfo esters comprised of an acid chain of from about six to about twelve carbons and an alcohol chain of from about six to about twelve carbons and detergents that may be a branched alcohol sulfate or a branched alcohol ether sulfate. Examples of wetters that are nonionic surfactants are block copolymers of molecular weight less than about 600 and derived from ethylene oxide/propylene oxide or other epoxide, and branched alcohols of from about eight to about sixteen carbons that have been ethoxylated with about four to about ten moles of ethylene oxide per mole alcohol and mixtures of such compounds. One such ethoxylated alcohol that is an ethoxylated alkylphenol is nonylphenol ethoxylated with ten moles ethylene oxide per mole nonylphenol.

A preferred alpha sulfo ester salt composition is sold under the trade designation DOSS 70. The composition comprises seventy percent by weight sodium di-octyl sulfo-succinate prepared by esterification of 2-ethylhexanol with di-functional sulfonated succinic acid.

The wetter and foamer may be mixed together to form a pre-mix to which water may be added later to produce a dust suppressant. The pre-mix may then be shipped relatively inexpensively in such light weight form and water may be added after shipping. Alternatively, the wetter and foamer may be added separately to water. The wetter and foamer are incorporated into the pre-mix or final suppressant in a wetter to foamer weight ratio of from about 1:1 to about 20:1, preferably from about 3:1 to about 10:1. If the wetter and foamer are incorporated in relative proportions within these ranges, the proportion of the wetter and foamer to water in the suppressant can vary over a broad range. However, it is preferred that the weight ratio of the combination of wetter and foamer to water in the suppressant be from about 1:50 to about 1:2,000. Thus, if for flowability and handling the pre-mix contains water in addition to the surfactants in a weight ratio of, for example, about 4:1 to about 10:1, the pre-mix would be diluted in water by a factor of, say, about 25:1 to about 200:1 prior to application to the dust source. If a dry or low water pre-mix is prepared, water may be added at the site where dust suppression is to take place.

The suppressant may further include other ingredients. For example, foam boosters such as alkyl amineoxides, alkynol amides, lignin sulfonates, detergent range alcohols, ethoxylated alcohols, xanthin gum derivatives and polyethylene glycol may be included. In addition, a nonionic alcohol ether solvent such as ethylene glycol monobutyl ether may be included to prevent gelling during blending and to stabilize the finished formulation. The suppressant may also contain a nonionic hydrotrope such as urea or an anionic hydrotrope such as sodium xylene sulfonate to prevent gelling during blending.

The suppressant may be employed as a wet suppressant or as a foam suppressant. If it is to be applied as a foam suppressant, it can be foamed by conventional techniques, such as by means of passage of the suppressant through a packed column, a venturi or a static mixer. Application as a foam permits greater coverage with smaller amounts of water than application as a wet suppressant and so foam is preferred.

As noted above, the preferred weight ratio of wetter/foamer combination to water in the suppressant is preferably from about 1:50 to about 1:2,000 (i.e., about 0.5:1,000 to about 40:1,000). If the suppressant is to be applied as a wet suppressant, the preferred ratio is closer to 40:1,000. If the suppressant is to be employed as a foam suppressant, the preferred ratio is in the range of about 10:1,000 to about 30:1,000.

The suppressant can be applied to the dust source by conventional techniques for application of a wet or foam suppressant, as the case may be. Thus, for example, the foam suppressant may be applied via nozzles arranged immediately preceding an impact or transfer point, such as just before a free-fall. The nozzles are oriented so that the foam forms a blanket over the dust source. If desired, additional nozzles may also be placed under the dust source for application of the foam suppressant to form a blanket under the dust source as well as over it. For example, as coal is conveyed over a ledge for freefall into a barge, nozzles may be place above the coal at the ledge to spray downwardly on the coal, and further nozzles may be placed under or slightly below the ledge to spray upwardly or outwardly at the other side of the moving stream of coal.

The suppressant of this invention is added to the coal or other dust source in an amount sufficient to suppress dust evolution. If the suppressant is added as a wet suppressant, this amount is generally about 0.05 to about 2, preferably about 0.2 to about 1, most preferably about 0.5, percent by weight of the wetted coal or other source. If the suppressant is added as a foam suppressant, this amount is generally about 0.05 to about 1, preferably about 0.05 to about 0.5, most preferably about 0.05 to about 0.2, percent by weight of the wetted coal or other source. It has been found that these small amounts are sufficient to maintain dust suppression effectiveness across several impact points even without reapplications.

The following examples describe preferred embodiments of the invention. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims which follow the examples. In the examples all percentages are given on a weight basis unless otherwise indicated.

EXAMPLE 1

The following low water pre-mix suppressant formulations were prepared:

| Formulation | Component | Weight % |
|---|---|---|
| A | DOSS 75 | 12.5 |
|   | 48 Strippings | 12.5 |
|   | S.P.A.M. | 6.0 |
|   | Water | 69.0 |
| B | DOSS 75 | 12.5 |
|   | 48 Strippings | 12.5 |
|   | AS-40 | 2.5 |
|   | Urea 40 | 5.0 |
|   | Water | 67.5 |
| C | DOSS 75 | 20.0 |
|   | 48 Strippings | 20.0 |
|   | AS-40 | 10.0 |
|   | Urea 40 | 5.0 |
|   | Water | 45.0 |
| D | DOSS 70 | 12.5 |
|   | EB | 5.0 |
|   | AS-40 | 2.5 |
|   | Urea 40 | 20.0 |
|   | Water | 61.5 |
| E | DOSS 70 | 20.0 |
|   | EB | 10.0 |
|   | AS-40 | 7.5 |
|   | Urea 40 | 10.0 |
|   | Water | 52.5 |
| F | DOSS 70 | 12.5 |
|   | EB | 3.5 |
|   | AS-40 | 2.5 |
|   | Urea 40 | 35.0 |
|   | Water | 46.5 |
| G | DOSS 70 | 17.6 |
|   | EB | 8.8 |
|   | AS-40 | 7.5 |
|   | Urea 40 | 10.0 |
|   | Water | 56.1 |
| H | DOSS 70 | 12.5 |
|   | EB | 5.0 |
|   | AS-40 | 2.5 |
|   | Urea 40 | 25.0 |
|   | Water | 55.0 |
| I | DOSS 70 | 17.6 |
|   | EB | 10.0 |
|   | AS-40 | 7.5 |
|   | Urea 40 | 10.0 |
|   | Water | 54.9 |
| J | DOSS 70 | 31.5 |
|   | EB | 12.5 |
|   | AS-40 | 6.0 |
|   | Urea 40 | 50.0 |
| K | DOSS 70 | 42.0 |
|   | EB | 21.0 |
|   | AS-40 | 16.0 |
|   | Urea 40 | 21.0 |
| L | DOSS 70 | 38.0 |
|   | Tergitol 15-S-7 | 38.0 |
|   | AS-40 | 20.0 |
|   | SXS 40 | 3.0 |
|   | Neodol 23 | 1.0 |

In these formulations, DOSS 75 and DOSS 70 represent a 75% and a 70%, respectively, by weight aqueous solution of sodium di-octyl sulfo-succinate derived from esterification of 2-ethyl-hexanol with sulfonated succinic acid (di-functional). EB and 48 Strippings are solvents employed to solvate the wetter, EB being ethylene glycol monobutyl ether. S.P.A.M. is a mixture of AS-40 and lauryl ether sulfate, AS-40 being a 40% by weight aqueous solution of sodium alpha-olefin (C-12) sulfonate sold by Stepan Chemical Company. Urea 40 is a 40% by weight aqueous solution of urea. Tergitol 15-S-7 is a nonionic wetter that is a branched C-15 alcohol with seven moles of ethoxylation, sold by Union Carbide. SXS is a hydrotrope which is a 40% by weight aqueous sodium xylene sulfonate. Neodol 23 is a mixture of C-12 and C-13 alcohol which is a foam or film stabilizer. Water represents added water in addition to that included in the DOSS, AS-40 and Urea 40 referred to in the chart.

EXAMPLE 2

Water was mixed with a sample of low water pre-mix G of Example 1 in a water to pre-mix weight ratio of about 30:1. The diluted composition was foamed and applied by nozzles at one point at a rate of 250 gallons of water and 8.3 gallons of pre-mix per hour to coal moving at 1560 tons per hour. Thus, the resulting added water content of the wetted coal was 0.07% by weight and the pre-mix was added at a rate of 0,005 gallons per ton. The same method was carried out with standard foam applied at two impact points instead of the single point with the foam derived from pre-mix G. The standard foam was added at a rate of 500 gallons of water and 16.6 gallons of standard pre-mix per hour to coal moving at 1560 tons per hour. Thus, the resulting added water content of the wetted coal was 0.14% by weight and the standard pre-mix was added at a rate of 0.01 gallons per ton. Measurements of airborne dust were taken at three points along the conveyor for each foam trial and for a trial without foam, with the following average measurements in milligrams of dust per cubic meter of air at each measurement point:

| Point | Untreated | Treated with Standard Foam | Treated with Pre-Mix G Foam |
| --- | --- | --- | --- |
| 1 | 9.2 | 2.0 | 1.3 |
| 2 | 13.1 | 2.3 | 1.7 |
| 3 | 5.1 | 2.0 | 1.1 |

EXAMPLE 3

Water was mixed with a sample of low water pre-mix C of Example 1 in a water to pre-mix weight ratio of about 56:1 and applied by nozzles at a rate of 450 gallons of water and 8 gallons of pre-mix per hour to coal moving at 350 tons per hour. Thus, the resulting added water content of the wetted coal was 0.54% by weight and the premix was added at a rate of 0.023 gallons per ton. Without treatment, the dust level was measured as 80 to 84 seconds of airborne dust observed during charging. Upon treatment, the dust level was measured as 32 to 40 seconds of airborne dust observed during charging.

EXAMPLE 4

Water was mixed with a sample of low water pre-mix G of Example 1 in a water to pre-mix weight ratio of about 107:1 and applied by nozzles at a rate of 240 gallons of water and 2.25 gallons of pre-mix per hour to coal moving at 875 tons per hour. Thus, the resulting added water content of the wetted coal was 0.11% by weight and the pre-mix was added at a rate of 0,003 gallons per ton. The dust level as measured before and after treatment at several points along side the coal conveyor was as follows (in milligrams per cubic meter of air):

| Untreated | Treated |
| --- | --- |
| 2.3 | 0.5 |
| 4.1 | 0.7 |
| 3.2 | 1.0 |
| 16.6 | 2.0 |

EXAMPLE 5

Water was mixed with a sample of diluted low water pre-mix A of Example 1 in a water to pre-mix weight ratio of about 23:1 and applied by nozzles at a rate of 2040 gallons of water and 90 gallons of pre-mix per hour to coal moving at 1700 tons per hour. Thus, the resulting added water content of the wetted coal was 0.50% by weight and the pre-mix was added at a rate of 0.053 gallons per ton. Effective dust suppression was noted.

In view of the above, it will be seen that the several advantages of the invention are achieved and other advantageous results attained.

As various changes could be made in the above methods and compositions without departing from the scope of the invention, it is intended that all matter contained in the above description shall be interpreted as illustrative and not in a limiting sense.

What is claimed:

1. A method for short term residual suppression of dust comprising application of an aqueous short term residual dust suppressant to a medium prone to liberation of dust, the dust suppressant being free of acrylic polymers and comprising from about 50 parts by weight to about 2,000 parts by weight water per part by weight of a combination of an anionic foamer and a nonionic or anionic wetter in a roamer to wetter weight ratio of from about 1:1 to about 1:20.

2. A method as set forth in claim 1 wherein the foamer is selected from the group consisting of alpha-olefin sulfonates, alcohol sulfates, alcohol ether sulfates, alpha sulfo esters and mixtures thereof.

3. A method as set forth in claim 2 wherein the alpha-olefin sulfonates have from about ten to about fourteen carbons, the alcohol sulfates have from about ten to about sixteen carbons, the alcohol ether sulfates have from about ten to about sixteen carbons, including from one to about six ethoxy units, and the alpha sulfo esters have an acid chain of from about two to about sixteen carbons, including an alcohol chain of up to about sixteen carbons.

4. A method as set forth in claim 3 wherein the wetter is selected from the group consisting of highly branched anionic surfactants, nonionic surfactants that are block copolymers of molecular weight less than about 600 and derived from ethylene oxide/propylene oxide or other epoxide, nonionic surfactants that are branched alcohols of from about eight to about sixteen carbons that have been ethoxylated with about four to about ten moles of ethylene oxide per mole alcohol, and mixtures thereof.

5. A method as set forth in claim 1 wherein the medium is coal.

6. A method as set forth in claim 5 wherein the dust suppressant is added as a foam.

7. A method as set forth in claim 6 wherein the dust suppressant is added to the coal in an amount such that the water in the dust suppressant is less than about one percent of the weight of the coal to which the dust suppressant is added.

8. A method as set forth in claim 1 wherein the application of the suppressant to the medium suppresses dust liberation from the medium by coating the medium with water.

* * * * *